(12) United States Patent
Wu (10) Patent No.: US 9,534,986 B2
(45) Date of Patent: Jan. 3, 2017

(54) BICYCLE RIM EXAMINATION DEVICE

(71) Applicant: Chia-Hsing Wu, Changhua County (TW)

(72) Inventor: Chia-Hsing Wu, Changhua County (TW)

(73) Assignee: ACHIMAY ENTERPRISE CO., LTD., Changhua County (TW)

( * ) Notice: Subject to any disclaimer, the term of this patent is extended or adjusted under 35 U.S.C. 154(b) by 309 days.

(21) Appl. No.: 14/327,803

(22) Filed: Jul. 10, 2014

(65) Prior Publication Data

US 2016/0011081 A1    Jan. 14, 2016

(51) Int. Cl.
*G01M 17/013*    (2006.01)

(52) U.S. Cl.
CPC .................. *G01M 17/013* (2013.01)

(58) Field of Classification Search
CPC ... B60B 2320/00; G01B 5/255; G01M 17/013
USPC ...................................................... 73/116.01
See application file for complete search history.

(56) References Cited

U.S. PATENT DOCUMENTS

| | | | | |
|---|---|---|---|---|
| 3,964,303 A * | 6/1976 | Vexelman | ............ | G01B 21/08 33/203 |
| 4,126,942 A * | 11/1978 | Damman | ............... | G01B 5/255 33/203.12 |
| 4,567,667 A * | 2/1986 | Minagawa | ............. | G01B 5/255 33/203.12 |
| 4,901,560 A * | 2/1990 | Hirano | .................. | G01B 7/315 33/203.13 |
| 5,103,414 A * | 4/1992 | Papadopoulos | ......... | G01L 5/042 33/203.16 |
| 5,815,935 A * | 10/1998 | Fukuda | .................. | G01B 5/255 33/203.12 |
| 6,018,878 A * | 2/2000 | Fukuda | .................. | G01B 5/255 33/203.12 |
| 6,735,878 B2 * | 5/2004 | Lie | ......................... | B60B 31/02 29/407.09 |
| 8,646,330 B2 * | 2/2014 | Lin | ....................... | G01M 1/225 73/457 |
| 8,904,863 B1 * | 12/2014 | Voeller | ................ | G01M 17/021 73/460 |
| 9,288,447 B2 * | 3/2016 | Leobal | ................ | G01M 17/021 |

* cited by examiner

*Primary Examiner* — Freddie Kirkland, III
(74) *Attorney, Agent, or Firm* — Pro-Techtor International Services; Ian Oglesby (57) ABSTRACT

A bicycle rim examination device includes a body having a base and two upright side frames extend from the base. Each of the two side frames has a first cylinder, a second cylinder and a third cylinder connected to the top thereof. Each of the second and third cylinders is connected with a roller. A power supply device is located on one end of the body and has transmission shaft which has a roller and is driven by a motor. The transmission shaft is supported by two slides which are movable along two guide frames. A first detector with a first probe and a second detector with a second probe are connected to the body. The bicycle rim examination device examines the tension of the spokes and the roundness of the rim.

9 Claims, 11 Drawing Sheets

FIG. 11

BICYCLE RIM EXAMINATION DEVICE

BACKGROUND OF THE INVENTION

1. Fields of the Invention

The present invention relates to a bicycle rim examination device, and more particularly, to a bicycle rim examination device for providing a false damage tension to detect the bicycle rim.

2. Descriptions of Related Art

The bicycle rims affect the safety of operation of the bicycles and the conventional bicycle rim examination devices are disclosed in Taiwan Patent applications 148475, 166042, 335893, 1256922, M378851, and 200835911.

These disclosed examination devices are able to check the range of the deflection magnitude in axial and radial directions, however, they cannot examine the false tension that is released from the spokes.

Some examination devices are equipped with cylinders and each cylinder is connected with a roller which contacts the spokes, and the bicycle rim is rotated manually to detect the critical force that is able to damage the spoke. It is a time-consuming task to continuously rotate the rim by hands and the result may vary due to the uneven rotation of the rim.

The present invention intends to provide a bicycle rim examination device for providing a false damage tension to detect the bicycle rim so as to eliminate the shortcomings mentioned above.

SUMMARY OF THE INVENTION

The present invention relates to a bicycle rim examination device and comprises a body having a base and two upright side frames extend from the base. A support device has two first cylinders, two first blocks and two shafts. The two shafts are connected to the first cylinders respectively. The two first blocks are respectively fixed on two respective tops of the two side frames. A lateral operation device comprises two second cylinders, two third cylinders, two second blocks, two third blocks, two first links respectively connected to the two second cylinders, two second links respectively connected to the two third cylinders, a first rollers connected to the first link, and a second roller connected to the second link. Each of the two side frames has one of the two second blocks and one of the two third blocks connected to the top thereof.

A power supply device has two guide frames, two slides, a transmission shaft having a third roller, a motor, a push board, a locking board having a through hole, and a fourth cylinder. The two guide frames each have two grooves. Each slide has an aperture defined centrally therethrough and two ridges are formed on the top and the bottom of each slide. The two slides are movably connected to the two guide frames by slidably engaging the ridges with the grooves of the two guide frames. The transmission shaft extends through the two respective apertures of the two slides. One end of the transmission shaft is connected with the output shaft of the motor. The push board is connected to two respective sides of the two slides. The fourth cylinder is fixed to the locking board, and an output shaft of the fourth cylinder extends through the through hole of the locking board and is fixed to the push board. The locking board is fixed to two respective sides of the two side frames. An examination unit has a first detector with a first probe, and a second detector with a second probe. The first and second detectors are respectively fixed to the body.

Preferably, multiple upright frames are respectively located beside the two side frames and each upright frame is connected with the guide frame corresponding thereto.

Preferably, each guide frame has two end boards connected to two ends thereof.

Preferably, the first, second, third and fourth cylinders are hydraulic cylinders.

Preferably, two seats are connected to the two respective tops of the two side frames. The second and third blocks on each of the two side frames are connected to the two seats corresponding thereto.

Preferably, the body has a first rail connected thereto and a second rail is connected to the first rail. The first detector is connected to the first rail and the second detector is connected to the second rail.

Preferably, the first detector is slidably connected to the first rail.

Preferably, the second detector is slidably connected to the second rail.

Preferably, the second rail is perpendicularly connected to the first rail.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Referring to FIGS. 1 to 11, the bicycle rim examination device of the present invention comprises a body 10 having a base 11 and two upright side frames 12 extend from the base 11. A support device 20 has two first cylinders 21, two first blocks 22 and two shafts 23. The two shafts 23 are connected to the first cylinders 21 respectively. The two first blocks 22 are respectively fixed on two respective tops of the two side frames 12.

Figure 1:
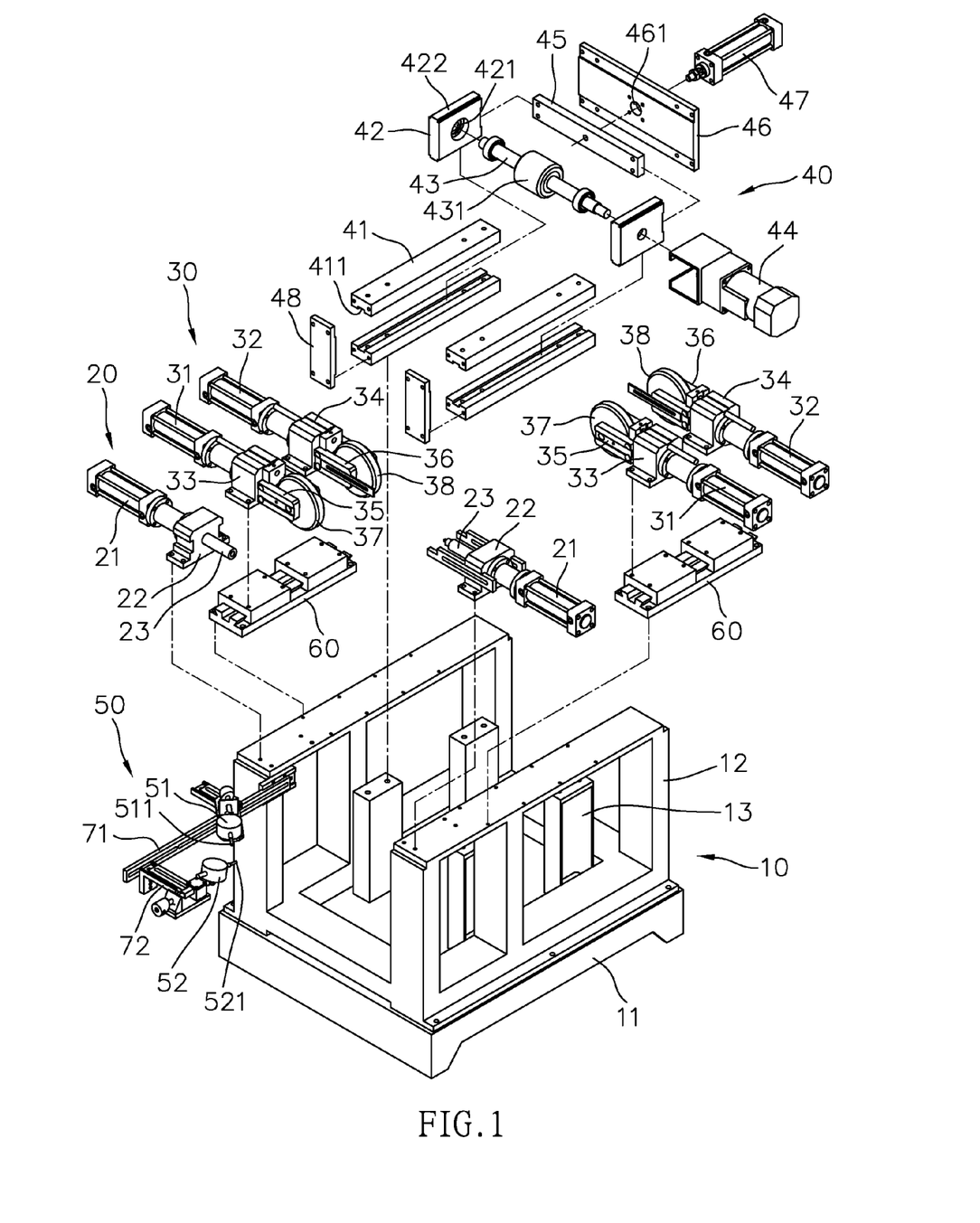
FIG. 1 is an exploded view of the bicycle rim examination device of the present invention.
Figure 2:
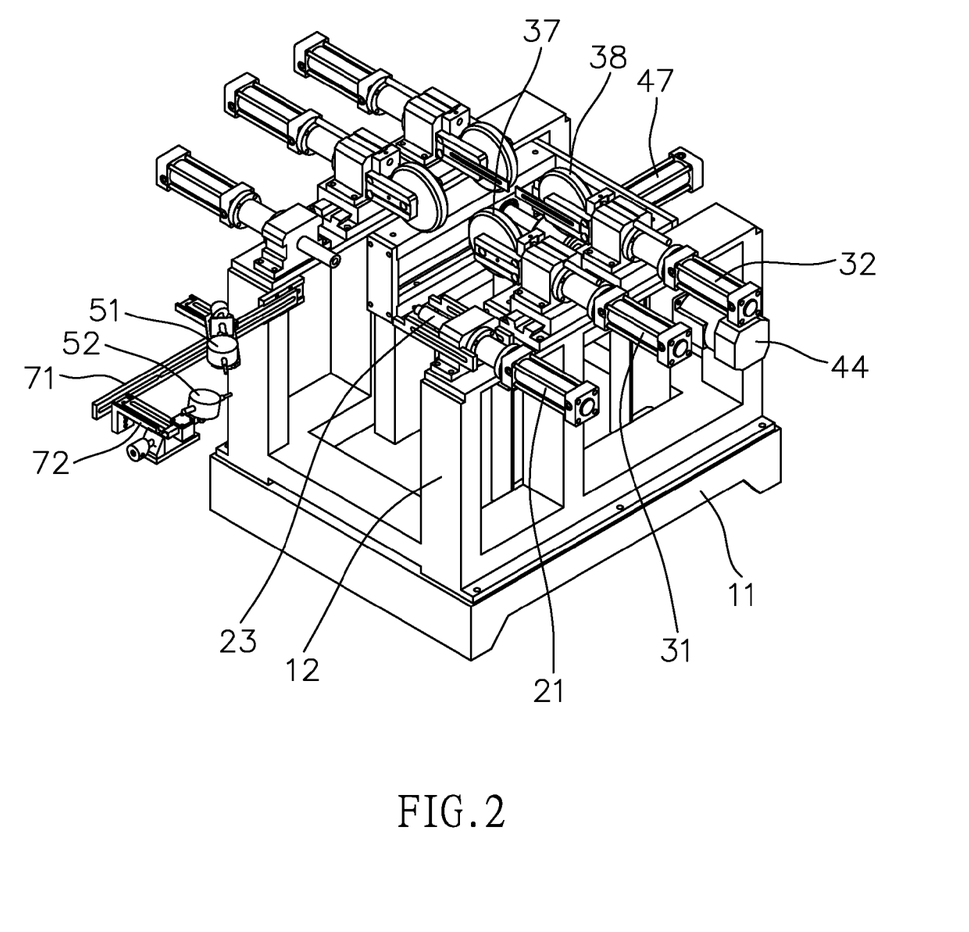
FIG. 2 is a perspective view to show the bicycle rim examination device of the present invention.
Figure 3:
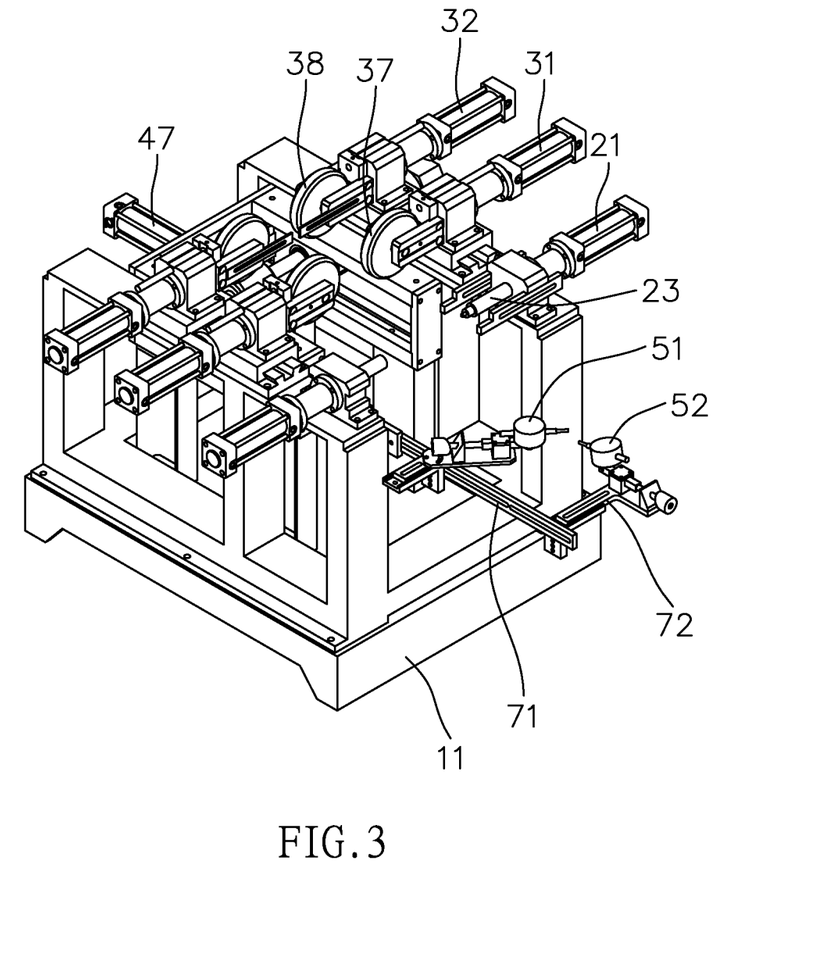
FIG. 3 is another perspective view to show the bicycle rim examination device of the present invention.

A lateral operation device 30 comprises two second cylinders 31, two third cylinders 32, two second blocks 33, two third blocks 34, two first links 35 respectively connected to the two second cylinders 31, two second links 36 respectively connected to the two third cylinders 32, a first rollers 37 connected to the first link 35, and a second roller 38 connected to the second link 36. Each of the two side frames 12 has one of the two second blocks 33 and one of the two third blocks 34 connected to the top thereof. In detail, two seats 60 are connected to the two respective tops of the two side frames 12. The second and third blocks 33, 34 on each of the two side frames 12 are connected to the two seats 60 corresponding thereto.

A power supply device 40 comprises two guide frames 41, two slides 42, a transmission shaft 43 having a third roller 431, a motor 44, a push board 45, a locking board 46 having a through hole 461, and a fourth cylinder 47. In this embodiment, the first, second, third and fourth cylinders 21, 31, 32, 47 are hydraulic cylinders. Two upright frames 13 are respectively located beside the two side frames 12 and each upright frame 13 is connected with the guide frame 41 corresponding thereto. Each guide frame 41 has two end boards 48 connected to two ends thereof. The two guide frames 41 each have two grooves 411. Each slide 42 has an aperture 421 defined centrally therethrough and two ridges 422 are formed on the top and the bottom of each slide 42. The two slides are movably connected to the two guide frames 41 by slidably engaging the ridges 422 with the grooves 411 of the two guide frames 41. The transmission shaft 43 extends through the two respective apertures 421 of the two slides 42. One end of the transmission shaft 43 is connected with the output shaft of the motor 44 so that the transmission shaft 43 is driven by the motor 44. The push board 45 is connected to two respective sides of the two slides 42. The fourth cylinder 47 is fixed to the locking board 46 and the output shaft of the fourth cylinder 47 extends through the through hole 461 of the locking board 46 and is fixed to the push board 45. The locking board 46 is fixed to two respective sides of the two side frames 13.

An examination unit 50 has a first detector 51 with a first probe 511, and a second detector 52 with a second probe 521. The body 10 has a first rail 71 connected thereto and a second rail 72 is perpendicularly connected to the first rail 71. The first detector 51 is slidably connected to the first rail 71 and the second detector 52 is slidably connected to the second rail 72.

Figure 4:
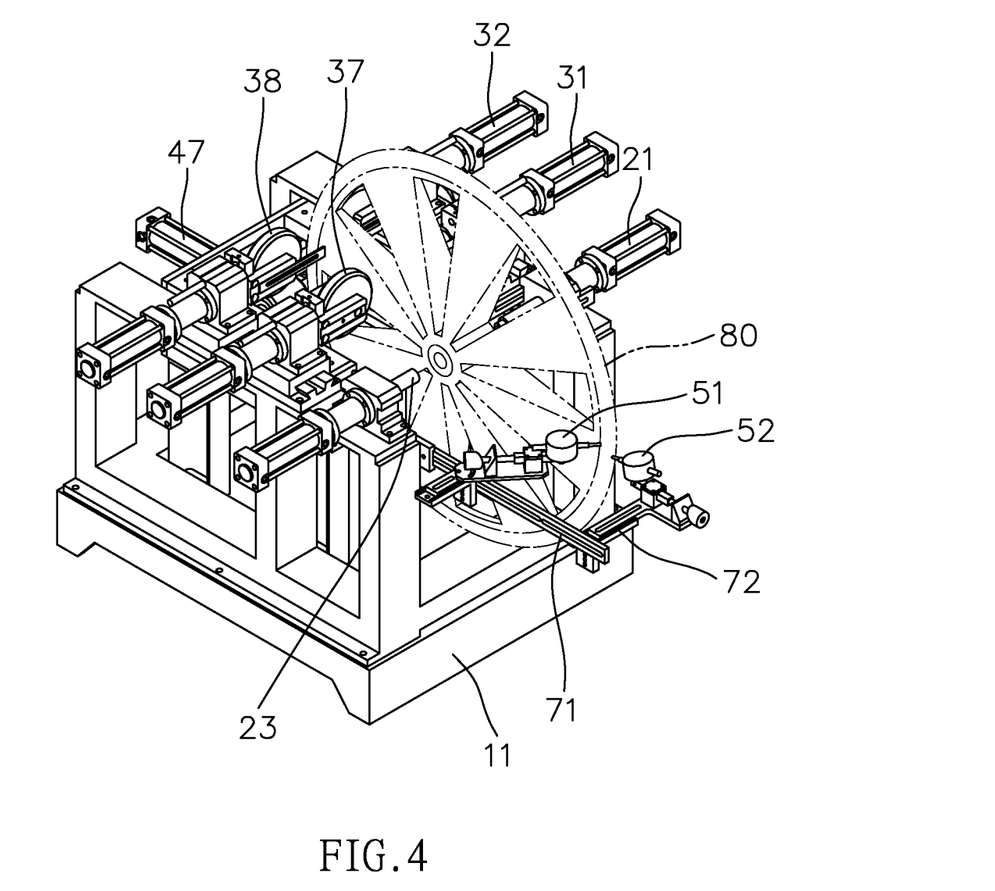
FIG. 4 is a perspective view to show the bicycle rim examination device of the present invention, wherein a bicycle rim is installed in the bicycle rim examination device of the present invention.
Figure 5:
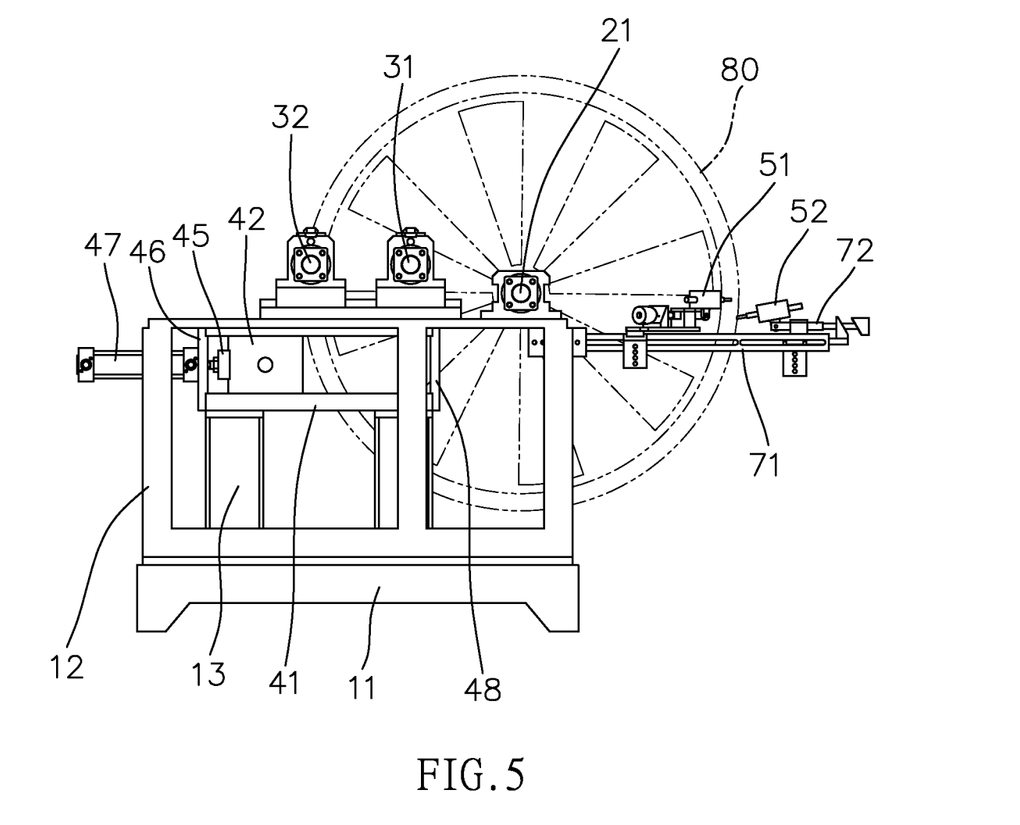
FIG. 5 is a side view the bicycle rim examination device of the present invention.
Figure 6:
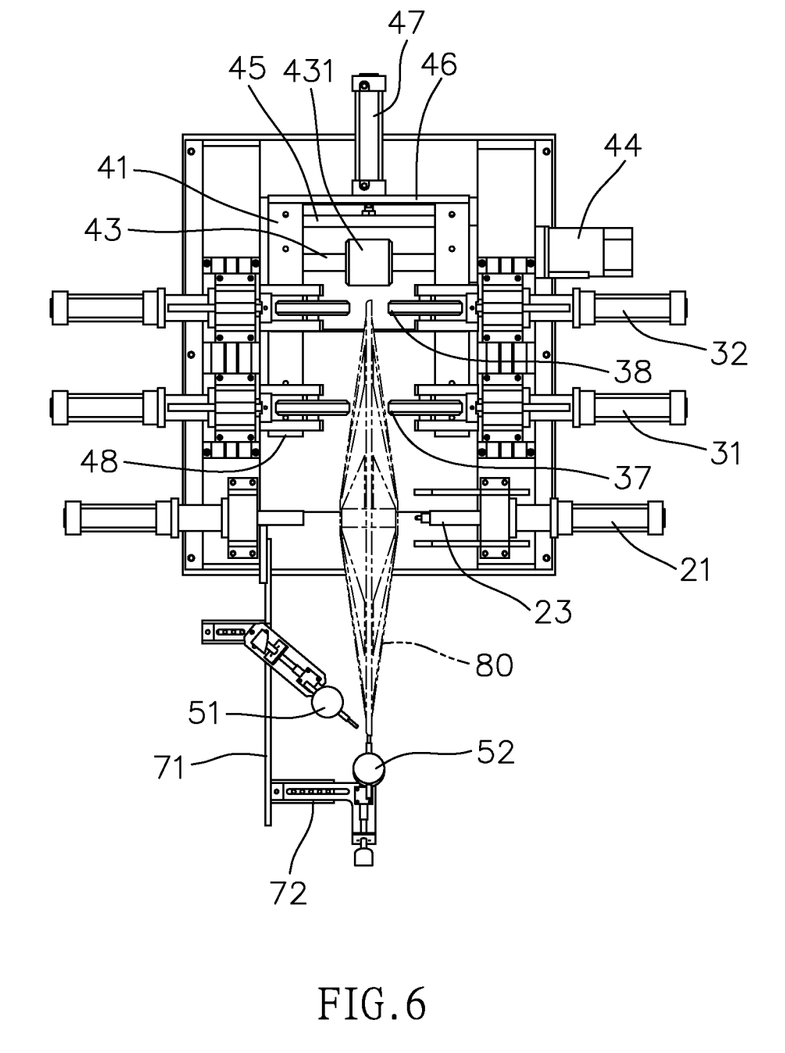
FIG. 6 is a top view the bicycle rim examination device of the present invention.
Figure 7:
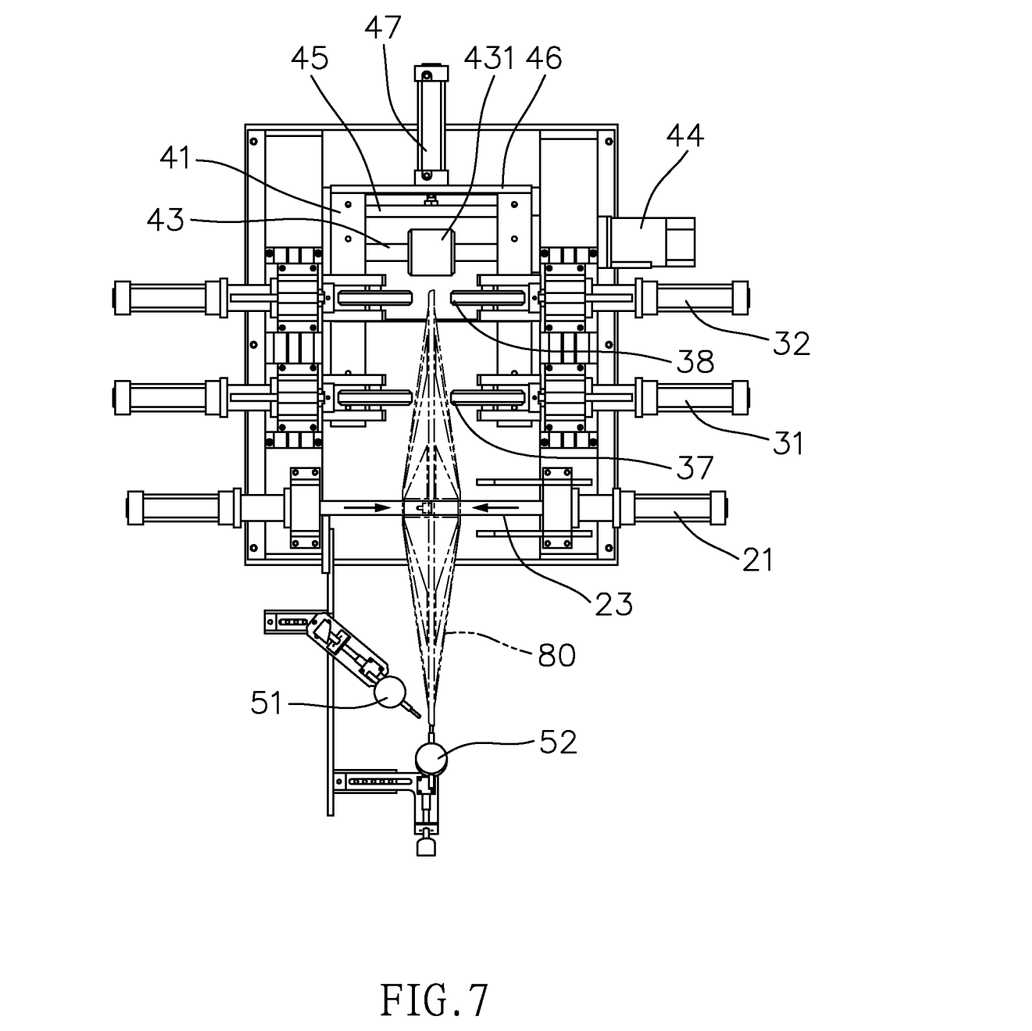
FIG. 7 is a top view the bicycle rim examination device of the present invention, wherein the two shafts extend.

When in use, the bicycle rim 80 is located between the two side frames 12 as shown in FIGS. 4 to 6, and the two respective shafts 23 of the first cylinders 21 extend as shown in FIG. 7 to be connected with the hub of the bicycle rim 80. The first detector 51 examines the deflection magnitude in axial and radial directions of the bicycle rim 80. The second detector 52 examines the roundness of the bicycle rim 80.

Figure 8:
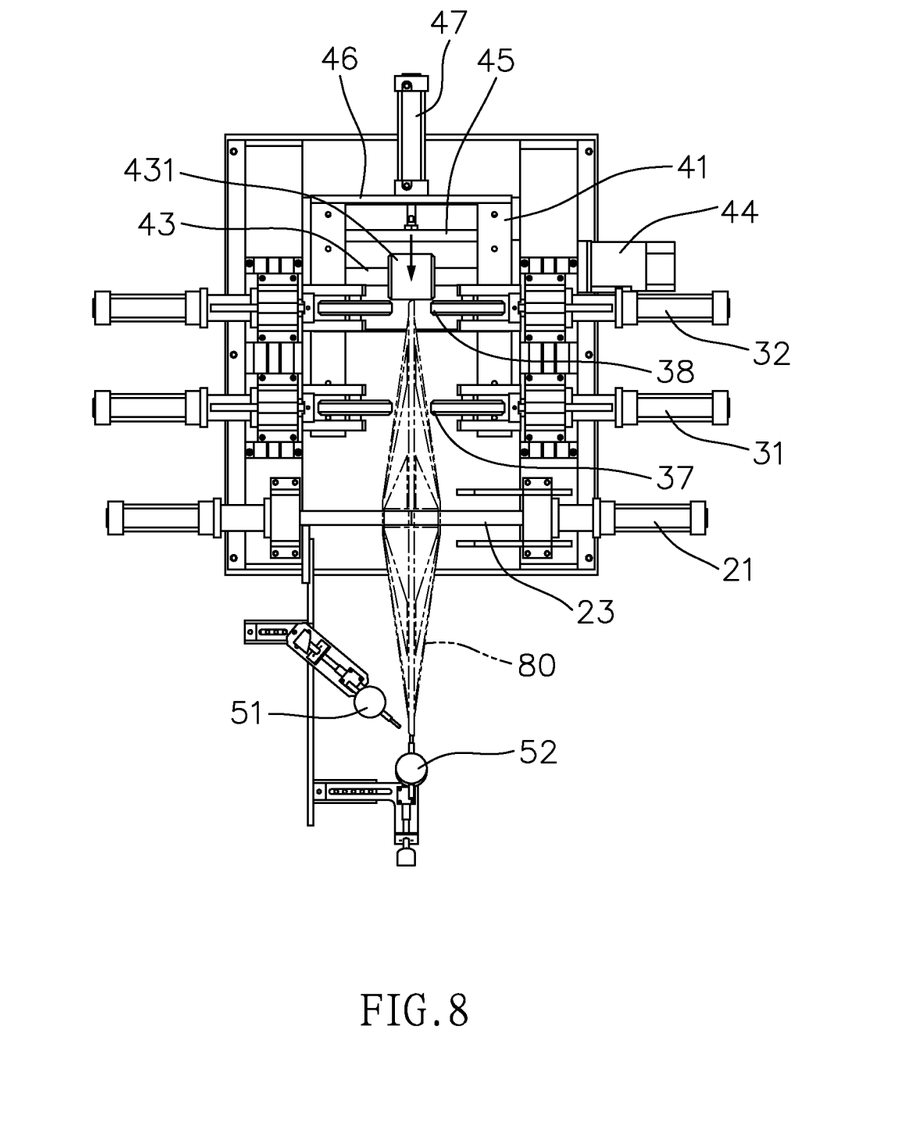
FIG. 8 is a top view the bicycle rim examination device of the present invention, wherein the third roller is moved to contact the bicycle rim.

The fourth cylinder 47 pushes the push board 45 to move the slides 42 relative to the guide grooves 411 of the guide frames 41 to contact the third roller 431 against the wheel rim 80 as shown in FIG. 8. The motor 44 drives the transmission shaft 43 to rotate the third roller 431 which rotates the bicycle rim 80.

Figure 9:
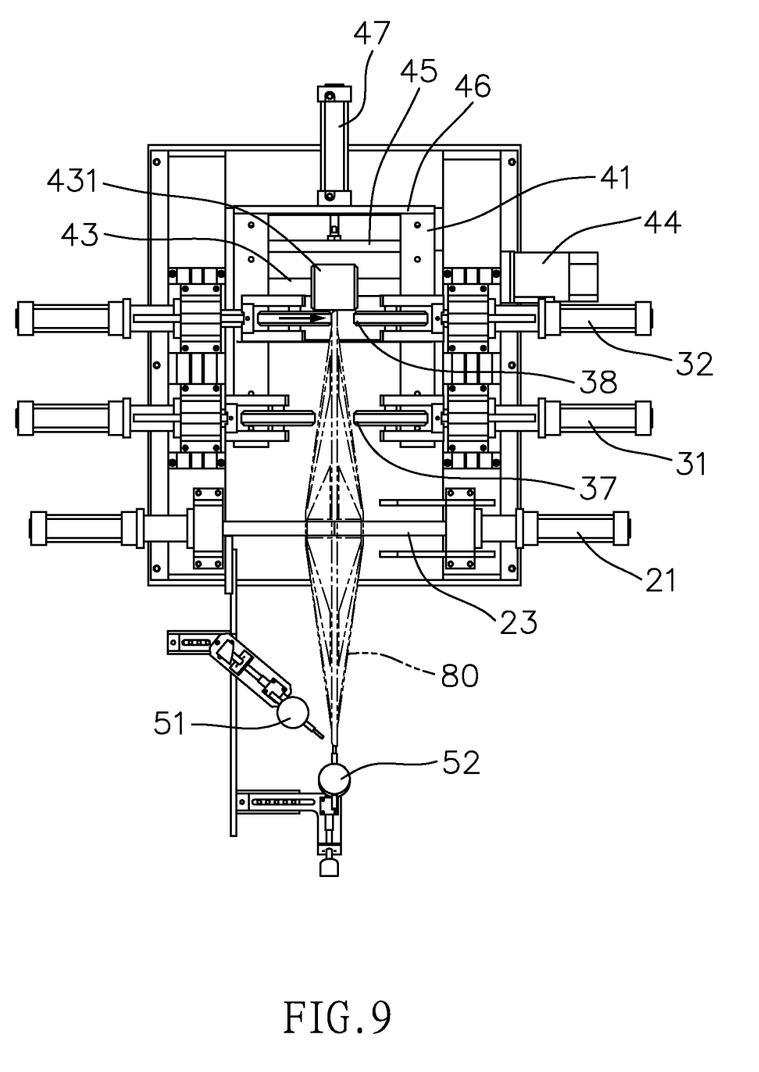
FIG. 9 is a top view the bicycle rim examination device of the present invention, wherein the left second roller is moved toward the bicycle rim.

The third cylinder 32 on one side of the bicycle rim 80 is activated to move the second roller 38 toward one side of the bicycle rim 80, the hydraulic force from the third cylinder 32 applies a false tension to the bicycle rim 80 as shown in FIG. 9. After the data is obtain, the second roller 38 is removed away from the side of the bicycle rim 80.

Figure 10:
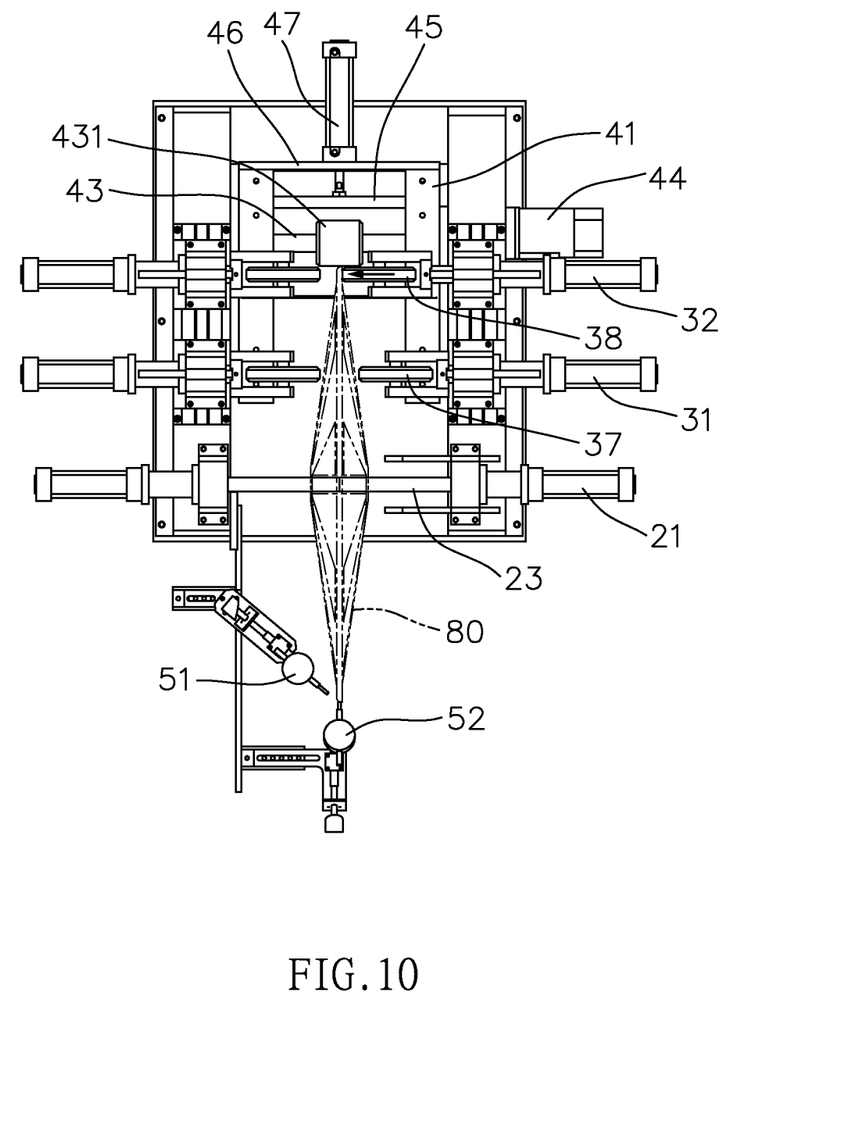
FIG. 10 is a top view the bicycle rim examination device of the present invention, wherein the right second roller is moved toward the bicycle rim.

The other third cylinder 33 on the other side of the bicycle rim 80 is then activated to move the second roller 38 toward the other side of the bicycle rim 80, the hydraulic force from the third cylinder 32 applies a false tension to the bicycle rim 80 as shown in FIG. 10. After the data is obtain, the second roller 38 is removed away from the side of the bicycle rim 80.

Figure 11:
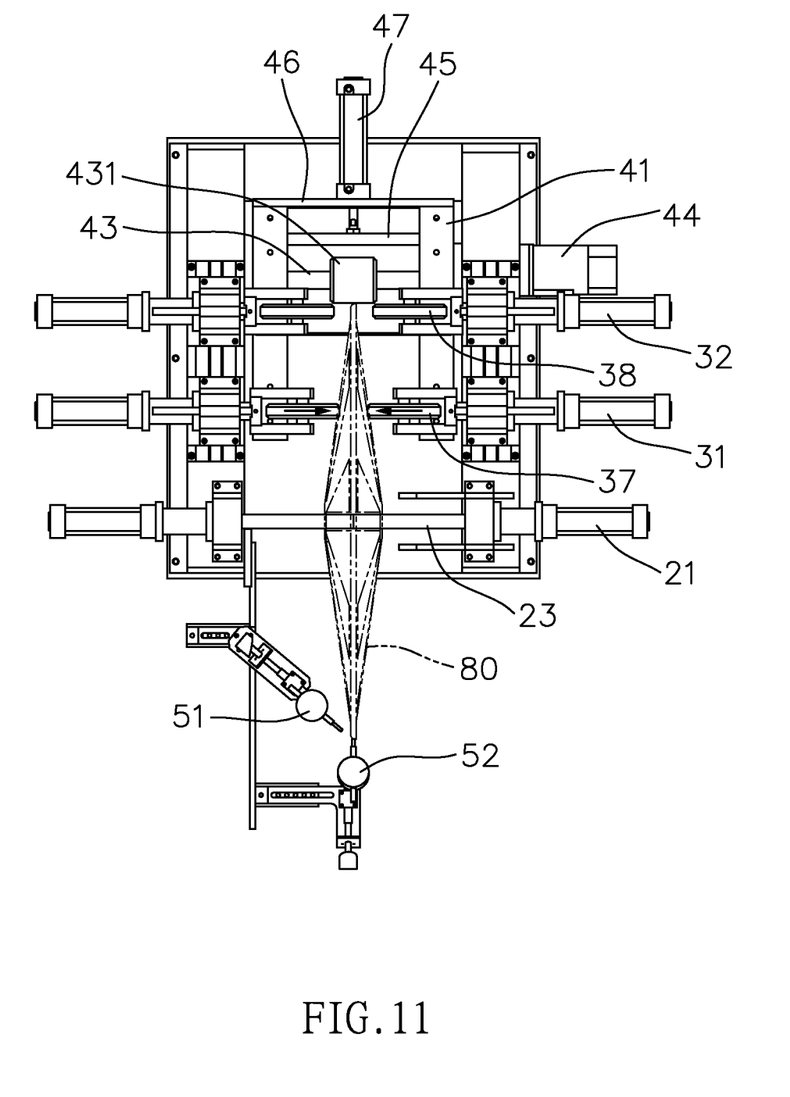
FIG. 11 is a top view the bicycle rim examination device of the present invention, wherein the two first rollers are moved toward the bicycle rim.

The second cylinders 31 on the two sides of the bicycle rim 80 are activated simultaneously to move the two first rollers 37 toward the bicycle rim 80. The two second cylinders 31 each apply a false tension to the bicycle rim 80 as shown in FIG. 11. After the data is obtain, the first rollers 37 are removed away from the side of the bicycle rim 80.

The bicycle rim examination device of the present invention examines the bicycle rim 80 easily and conveniently, and different types of data can be obtained within a short period of time.

While we have shown and described the embodiment in accordance with the present invention, it should be clear to those skilled in the art that further embodiments may be made without departing from the scope of the present invention.

What is claimed is:

1. A bicycle rim examination device comprising:
    a body having a base and two upright side frames extending from the base;
    a support device having two first cylinders, two first blocks and two shafts, the two shafts connected to the first cylinders respectively, the two first blocks respectively fixed on two respective tops of the two side frames;
    a lateral operation device comprising two second cylinders, two third cylinders, two second blocks, two third blocks, two first links respectively connected to the two second cylinders, two second links respectively connected to the two third cylinders, first rollers connected to the first links, and second rollers connected to the second links, each of the two side frames having one of the two second blocks and one of the two third blocks connected to the top thereof;
    a power supply device having two guide frames, two slides, a transmission shaft having a third roller, a motor, a push board, a locking board having a through hole, and a fourth cylinder, the two guide frames each having two grooves, each slide having an aperture defined centrally therethrough and two ridges formed on a top and a bottom of each slide, the two slides movably connected to the two guide frames by slidably engaging the ridges with the grooves of the two guide frames, the transmission shaft extending through the two respective apertures of the two slides, one end of the transmission shaft connected with an output shaft of the motor, the push board connected to two respective sides of the two slides, the fourth cylinder fixed to the locking board and an output shaft of the fourth cylinder extending through the through hole of the locking board and fixed to the push board, the locking board fixed to two respective sides of the two side frames, and
    an examination unit having a first detector with a first probe, and a second detector with a second probe, the first and second detectors respectively fixed to the body.

2. The device as claimed in claim 1, wherein multiple upright frames are respectively located beside the two side frames and each upright frame is connected with the guide frame corresponding thereto.

3. The device as claimed in claim 1, wherein each guide frame has two end boards connected to two ends thereof.

4. The device as claimed in claim 1, wherein the first, second, third and fourth cylinders are hydraulic cylinders.

5. The device as claimed in claim 1, wherein two seats are connected to the two respective tops of the two side frames, the second and third blocks on each of the two side frames are connected to the two seats corresponding thereto.

6. The device as claimed in claim 1, wherein the body has a first rail connected thereto and a second rail is connected to the first rail, the first detector is connected to the first rail and the second detector is connected to the second rail.

7. The device as claimed in claim 6, wherein the first detector is slidably connected to the first rail.

8. The device as claimed in claim 6, wherein the second detector is slidably connected to the second rail.

9. The device as claimed in claim 1, wherein the second rail is perpendicularly connected to the first rail.

\* \* \* \* \*